United States Patent
Crocker et al.

(10) Patent No.: US 9,656,169 B2
(45) Date of Patent: May 23, 2017

(54) CHARACTERIZATION OF PLAYER TYPE BY VISUAL ATTRIBUTES

(75) Inventors: John Holbrook Crocker, Valencia, CA (US); Bob Hickman, Simi Valley, CA (US); Allan D. Jones, Jr., Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 377 days.

(21) Appl. No.: 13/299,258

(22) Filed: Nov. 17, 2011

(65) Prior Publication Data

US 2013/0130792 A1 May 23, 2013

(51) Int. Cl.
*A63F 13/69* (2014.01)
*A63F 13/537* (2014.01)
*A63F 13/822* (2014.01)
*A63F 13/79* (2014.01)
*A63F 13/52* (2014.01)

(52) U.S. Cl.
CPC .......... *A63F 13/537* (2014.09); *A63F 13/52* (2014.09); *A63F 13/69* (2014.09); *A63F 13/79* (2014.09); *A63F 13/822* (2014.09); *A63F 2300/5553* (2013.01); *A63F 2300/57* (2013.01)

(58) Field of Classification Search
CPC .. A63F 13/10; A63F 13/12; A63F 2300/5553; A63F 2300/57; A63F 13/58; A63F 13/65; A63F 13/69; A63F 13/79; A63F 13/822
USPC .......................................................... 463/31
See application file for complete search history.

(56) References Cited

U.S. PATENT DOCUMENTS

| | | | |
|---|---|---|---|
| 8,108,459 B1 * | 1/2012 | Hoffman | H04L 65/403 709/203 |
| 2008/0146342 A1 * | 6/2008 | Harvey et al. | 463/42 |
| 2008/0146343 A1 * | 6/2008 | Sullivan et al. | 463/42 |
| 2010/0173712 A1 * | 7/2010 | Buhr | 463/42 |
| 2010/0261520 A1 * | 10/2010 | Lempel et al. | 463/25 |
| 2013/0086484 A1 * | 4/2013 | Antin | G06Q 10/10 715/751 |

* cited by examiner

*Primary Examiner* — Damon Pierce
(74) *Attorney, Agent, or Firm* — Patterson + Sheridan, LLP

(57) ABSTRACT

Systems and methods for generating and displaying a graphical representation of a player type profile. A respective player type profile may be generated for each of a plurality of users of a virtual environment that characterizes each user by a predominant player type. Player types may be defined by the designers of the virtual environment. The player type profile may be generated by logging the actions performed by the user when connected to the virtual environment and then analyzing the actions to determine the best characterization for the user.

15 Claims, 9 Drawing Sheets

CHARACTERIZATION OF PLAYER TYPE BY VISUAL ATTRIBUTES

BACKGROUND OF THE INVENTION

Field of the Invention

Embodiments of the present disclosure relate generally to interactive games and, more specifically, to graphical representations of a player type profile (i.e., social badges).

Description of the Related Art

In recent history, computer-based games have appeared that enable a player to interact with other players in a virtual environment. One common type of computer-based game is called the massively multiplayer online game (MMOG), which includes the subgenre known as massively multiplayer online role playing game (MMORPG). One popular example of an MMORPG is the World of Warcraft™ game developed by Blizzard Entertainment®. In these interactive games, players are usually represented in the virtual world by an avatar. Avatars are graphical representations of the character that the player is controlling in the virtual world.

With the development of online games, Richard Bartle, a professor at the University of Essex and the creator of MUD (Multi-User Dungeon), developed a test for classifying players based on the player's preference for a particular type of gaming experience. The Bartle Test of Gamer Psychology (hereinafter "Bartle Test") is a scoring formula based on a player's answers to a series of questions. The Bartle Test categorized a player via a Bartle Quotient that ranks the player's relative preference for playing style within four categories: (1) killer, (2) socializer, (3) achiever, and (4) explorer. A "killer" is a type of player that prefers to compete directly with other players. For example, a killer type player prefers a game in which the player is pitted in a virtual battle against an opponent. A "socializer" is a type of player that prefers to interact with other players. For example, a socializer type player may prefer to chat with other players via an instant messaging feature within the game, or develop a friend-list that includes a plurality of other players within the game. An "achiever" is a type of player that prefers to gain rewards within a game. For example, an achiever type player prefers to perform actions that are rewarded with points to increase the player's level within the game. An "explorer" is a type of player that prefers to discover areas within the virtual world. For example, an explorer type player prefers to search a virtual world to find hidden Easter eggs (i.e., a hidden message or feature within the game that is intentionally disguised by the programmer). The Bartle Quotient indicates the relative preferences for a player to exhibit game play associated with each of the four categories. Richard Bartle later expanded the player type categories in a related test to include eight different categories: (1) friend, (2) griefer, (3) hacker, (4) networker, (5) opportunist, (6) planner, (7) politician, and (8) scientist.

The Bartle Test, or other tests like the Bartle Test, may be used by game designers to develop games that cater to a particular type of player. For example, if a game developer wants to develop a game for explorers, then the game may include hidden levels, or large virtual worlds that may be explored at the leisure of the player. Alternatively, if the game developer wants to create a game for killers, the game may include many battle features that pit one player against another. Some games, especially MMORPGs, may cater to multiple types of players and be programmed so that players may interact within the virtual world in different ways. For example, such games may provide a feature that allows users to interact within a virtual meeting place and chat with other users via instant messaging while also enabling other players to simultaneously explore the virtual world or battle various opponents.

SUMMARY OF THE INVENTION

One embodiment of this disclosure sets forth a method for displaying social badges in a graphical user interface associated with a virtual environment. The method includes the steps of generating a player type profile for a user associated with the virtual environment, generating a graphical representation of the player type profile for display in the graphical user interface, and displaying the graphical representation in the graphical user interface proximate to an avatar associated with the user.

Another embodiment of this disclosure sets forth a computer-readable medium storing instructions that, when executed by a processing unit, cause the processing unit to perform operations for displaying social badges in a graphical user interface associated with a virtual environment. The operations include generating a player type profile for a user associated with the virtual environment, generating a graphical representation of the player type profile for display in the graphical user interface, and displaying the graphical representation in the graphical user interface proximate to an avatar associated with the user.

Yet another embodiment of this disclosure sets forth a system for displaying social badges in a graphical user interface associated with a virtual environment that includes a processing unit and a memory storing an application. The application is configured to generate a player type profile for a user associated with the virtual environment, generate a graphical representation of the player type profile for display in the graphical user interface, and display the graphical representation in the graphical user interface proximate to an avatar associated with the user.

BRIEF DESCRIPTION OF THE DRAWINGS

So that the manner in which the above recited features of the disclosure can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DETAILED DESCRIPTION

In the following description, numerous specific details are set forth to provide a more thorough understanding of the disclosure. However, it will be apparent to one of skill in the art that the disclosure may be practiced without one or more of these specific details. In other instances, well-known features have not been described in order to avoid obscuring the disclosure.

In some interactive games, players may join with other players to perform missions or play the game according to their particular playing styles. One disadvantage with conventional games is that a player may have difficulty discovering other players within the virtual world that share that player's preference for playing style. For example, a first player may be a socializer while a second player may be an explorer. The first player may initialize a chat with the second player, but the second player is more interested in exploring the virtual world and is therefore anxious to end the chat quickly and find other players interested in exploring the virtual world. This interaction may be frustrating to the first player that is looking for other players that want to socialize and are less interested in exploring the virtual world.

According to the disclosed embodiments, player's are graphically represented in a manner that reflects that particular player's playing style. Consequently, other players in the virtual environment may quickly choose whether to initiate contact with another player based on the players' common preferences for how to interact within the virtual world. Such indicators may make the experience within the game more enjoyable for a player because the player wastes less time searching out like-minded players within the virtual world.

System Overview

Figure 1:
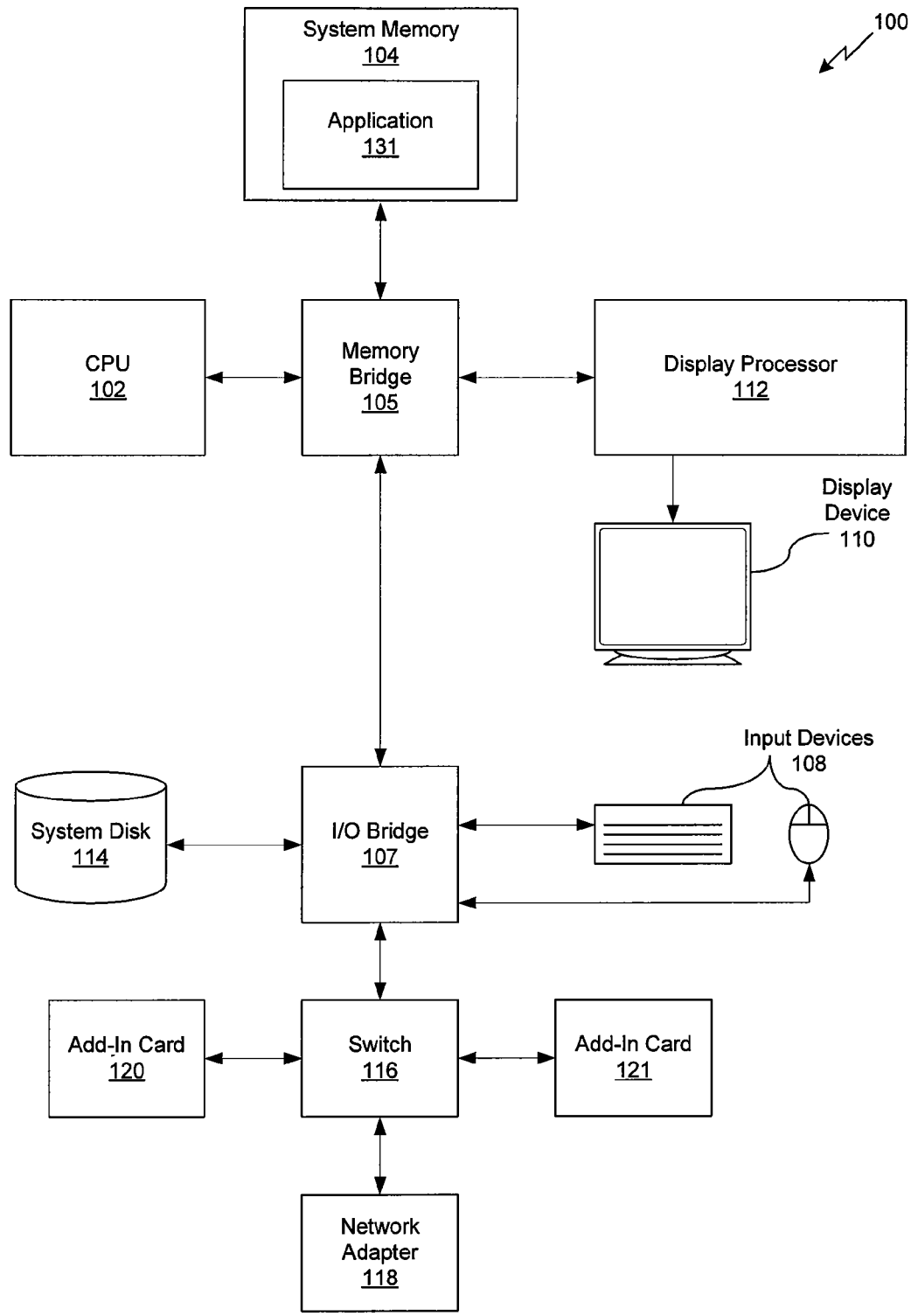
FIG. 1 is a block diagram of a system configured to implement one or more aspects of the present disclosure.

FIG. 1 is a block diagram of a system 100 configured to implement one or more aspects of the present disclosure. System 100 may be a computer workstation, personal computer, video game console, personal digital assistant, rendering engine, mobile phone, hand held device, smart phone, or any other device suitable for practicing one or more embodiments of the present disclosure.

As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link). In one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system-on-chip (SoC). In still further embodiments, display processor 112 is omitted and software executed by CPU 102 performs the functions of display processor 112.

Pixel data can be provided to display processor 112 directly from CPU 102 to generate images for display. Display processor may generate conventional images for display on conventional display devices or, alternatively, stereo images for 3D viewing on 3D capable displays. In some embodiments, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on other computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 131 is stored in system memory 104. Application 131 may be a MMOG or MMORPG that, when executed on CPU 102, enables a user to interact with other users or computer-generated entities within a virtual environment. In alternative embodiments, application 131 may be a web application such as a Flash™ program or Java™ applet, which is stored on a remote server and accessed through network adapter 118. Such web applications may be viewed with a thin client such as a web browser or stand alone application executed on CPU 102.

In yet other embodiments, application 131 may connect to an ad hoc network formed by connecting a plurality of computers similar to system 100 via network adapters 118, described above. In such embodiments, application 131 may be configured to store information related to the user of system 100 and communicate with other applications on the other computers connected to the network. The other computers may also include instances of application 131 being used by the respective users of the other computers to connect to an online virtual environment. In such a manner, remote users may connect to the same virtual environment and interact and communicate with each other within the virtual environment.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2:
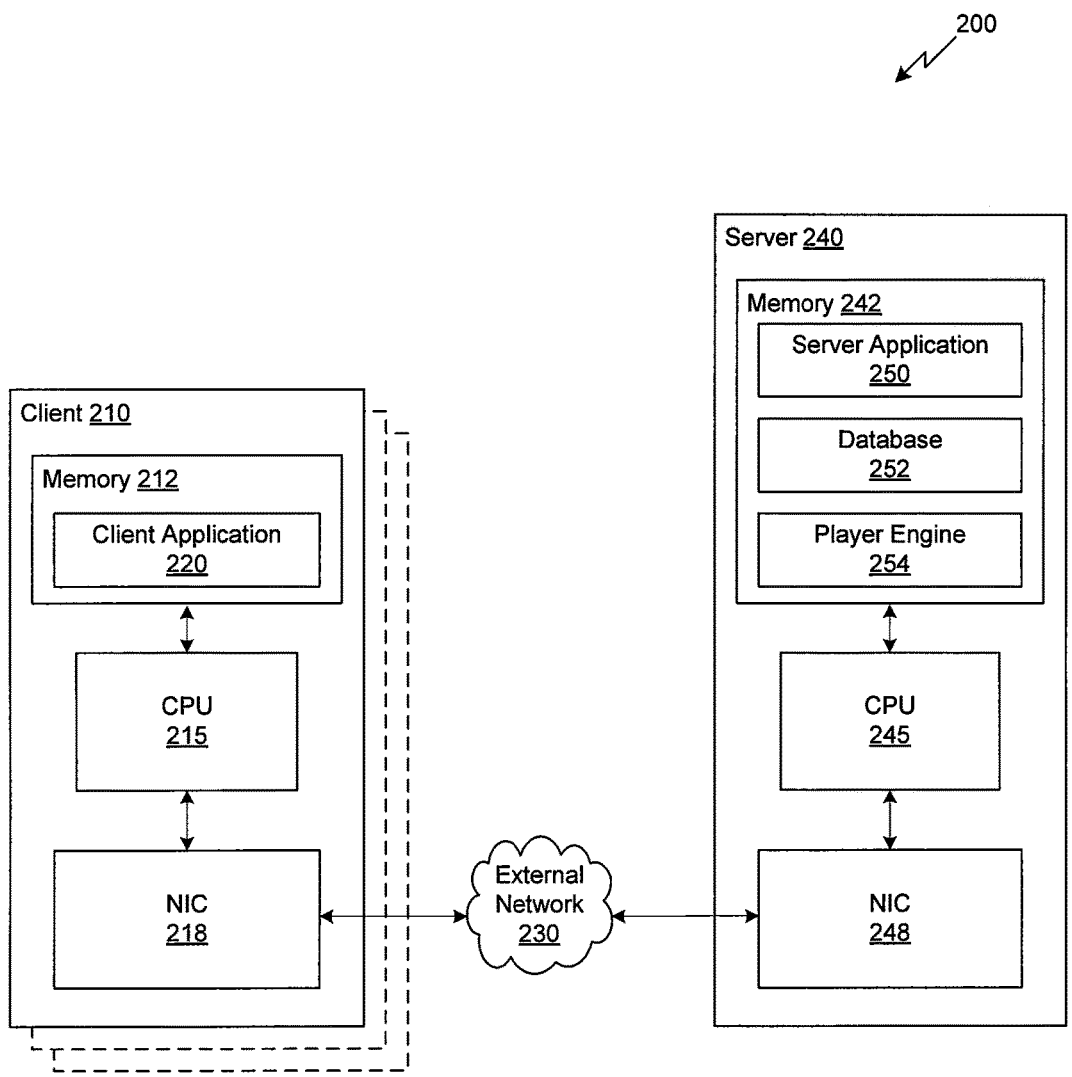
FIG. 2 illustrates a block diagram of a network system configured to implement one or more aspects of the present disclosure.

FIG. 2 illustrates a block diagram of a network system 200 configured to implement one or more aspects of the present disclosure. Client computer 210 includes a CPU 215, a network interface card (NIC) 218, and a system memory 212 that stores a client application 220. Server computer 240 includes a CPU 245, a NIC 248, and a system memory 242 that stores server application 250, database 252, and player engine 254. In one embodiment, client application 220 may be a web browser configured to display a graphical user interface (GUI) associated with server application 250. For example, server application 250 may be a web-based application hosted by server computer 240 that is configured to embed a Flash™ program or Java™ applet within HTML code that is transmitted to client computer 210. The program or applet collects input from the user and displays images that show a graphical representation of the virtual environment. The program or applet may be configured to process the input locally via CPU 215, or transmit the input to server computer 240 for processing via CPU 245. It will be appreciated that one or more other components of client computer 210 and/or server computer 240 are not shown to avoid obscuring the disclosure. Such other components may include the components as shown and described in conjunction with FIG. 1, such as display processor 112, as well as other components well-known to those of skill in the art.

One or more client computers 210 communicates with server computer 240 via an external network 230. In one embodiment, external network 230 is the Internet. An operating system executing within client computer 210 may implement a TCP/IP (Transmission Control Protocol and Internet Protocol) stack that provides an application interface for client application 220 to send or receive asynchronous data packets to/from server application 250. For example, a user may open a web browser on client computer 210 and type in an URL (uniform resource locator) that identifies the server application 250 on the server computer 240. The server application 250 may transmit a webpage to client computer 210 that includes an embedded web application. The web application may generate a GUI for a MMORPG that enables a user to interact with other players connected to server computer 240 via external network 230.

In one embodiment, database 252 stores data related to server application 250 including information related to a plurality of users connected to server 240. For example, database 252 may store information related to the location of each user in the virtual environment defined by server application 250 as well as a player type profile associated with each user. Server application 250 may query the database 252 in order to dynamically generate a graphical representation of the virtual environment that is transmitted to and displayed by client application 220. For example, a query of database 252 may return a list of all users located within a similar location in a virtual environment such that a rendered scene of the virtual environment shows avatars associated with the current players in that location. Server application 250 may also update the information in database 252 depending on input received from each of the users connected to server computer 240. For example, database 252 may include an object (i.e., data structure) for each user that stores information about the user such as a coordinate that defines the location of the user in the virtual environment, graphical data that defines an avatar for the user, and a player type profile for the user.

In one embodiment, player engine 254 is executed on CPU 245 substantially in parallel with server application 250 and is configured to log actions of the various users as they interact within the virtual environment. Player engine 254 may then analyze the actions to generate a player type profile associated with each player. In one embodiment, player engine 254 creates and manages a log file in memory 242 that tracks the actions of each user connected to the virtual environment. Each entry in the log file may include an index, an action ID and a timestamp. The index indicates the number of actions included in the log file. The action ID specifies the type of action performed by the user, for instance, challenging another user to a race or communicating with another user via a chat window. The timestamp indicates the date and/or time the action was performed. In alternative embodiments, the entries in the log file may contain other information in addition to or in lieu of the action ID and the timestamp. For example, entries may include a location coordinate associated with the user that indicates a position of the user within the virtual environment when the action was performed. The entry may also include metadata about the action such as the results of a race, or the text entered into the chat window. Different embodiments may implement different types of entries within the log file in order to provide the information necessary for the particular algorithm implemented by player engine 254 to generate a player type profile.

Player engine 254 analyzes the entries in the log file and generates a player type profile associated with a user at that particular time. The player type profile may include a score associated with each of a plurality of player types defined by the designers of the virtual environment. In one embodiment, the player types may be the same player types as defined by the Bartle Test. In another embodiment, the designers may create custom player types of their choosing. Player engine 254 analyzes the actions in the log file and scores each of the actions as they relate to a particular player type. The cumulative scores for each of the different player types reflect the relative characterization of a user's actions.

For example, a first player may spend the majority of the time connected to the virtual environment interacting with other players using a chat feature. Player engine 254 may then determine that the first player is likely a socializer. Conversely, a second player may spend the majority of the time connected to the virtual environment navigating through various locations of the virtual environment. Player engine 254, by recording and analyzing the actions of the second user, may then determine that the second player is likely an explorer. Player engine 254 may then store the player type profile associated with each user profile in database 252.

In one embodiment, player engine 254 manages a log file that includes every action that a user has performed since the user created a user profile via server application 250. In another embodiment, player engine 254 only stores the N most recently completed actions in the log file. In yet another embodiment, player engine 254 only stores the actions performed within the last T amount of time in the log file. For example, the log file may store all actions performed by a user within the last 30 days. The storage capacity of memory 242 and the processing capacity of CPU 245 may limit the practical size of the various log files created by player engine 254 (i.e., the size of the log files may decrease performance of server application 250 if too much data is being analyzed by player engine 254 too frequently).

Player engine 254 analyzes the log file periodically to generate a new player type profile associated with a user. For example, player type profiles may be generated every time the user exits the game, after every N actions performed by a player, or once a month. The specific implementation of the player engine 254 may be different for different embodiments. For example, in one embodiment, player engine 254 may weigh actions differently such as by placing more weight in an action where a user challenged another player to a race than in an action where the user communicated using the chat window. A score for each of the different player types may be calculated by summing the weighted factors from all of the actions in the log file. For example, a log file may indicate that a player challenged three other players to three different races. The total score associated with the killer player type may be 6 points (2 points for each race). The log file may also indicate that the player entered 5 chats with other players, resulting in a total score associated with the socializer player type of 2.5 points (0.5 points for each chat initiated with another player).

In alternative embodiments, player engine 254 may weigh recently completed actions more heavily than previously completed actions. For example, the points associated with a given action may be multiplied by a decay factor that is calculated based on the index of the entry in the log file. In yet other embodiments, player engine 254 may determine a weight factor based on the performance of the action within the virtual environment, such as by weighing a race the user wins more heavily than a race the user loses or weighing a chat entry based on the number of characters in the chat entry.

Figure 3:
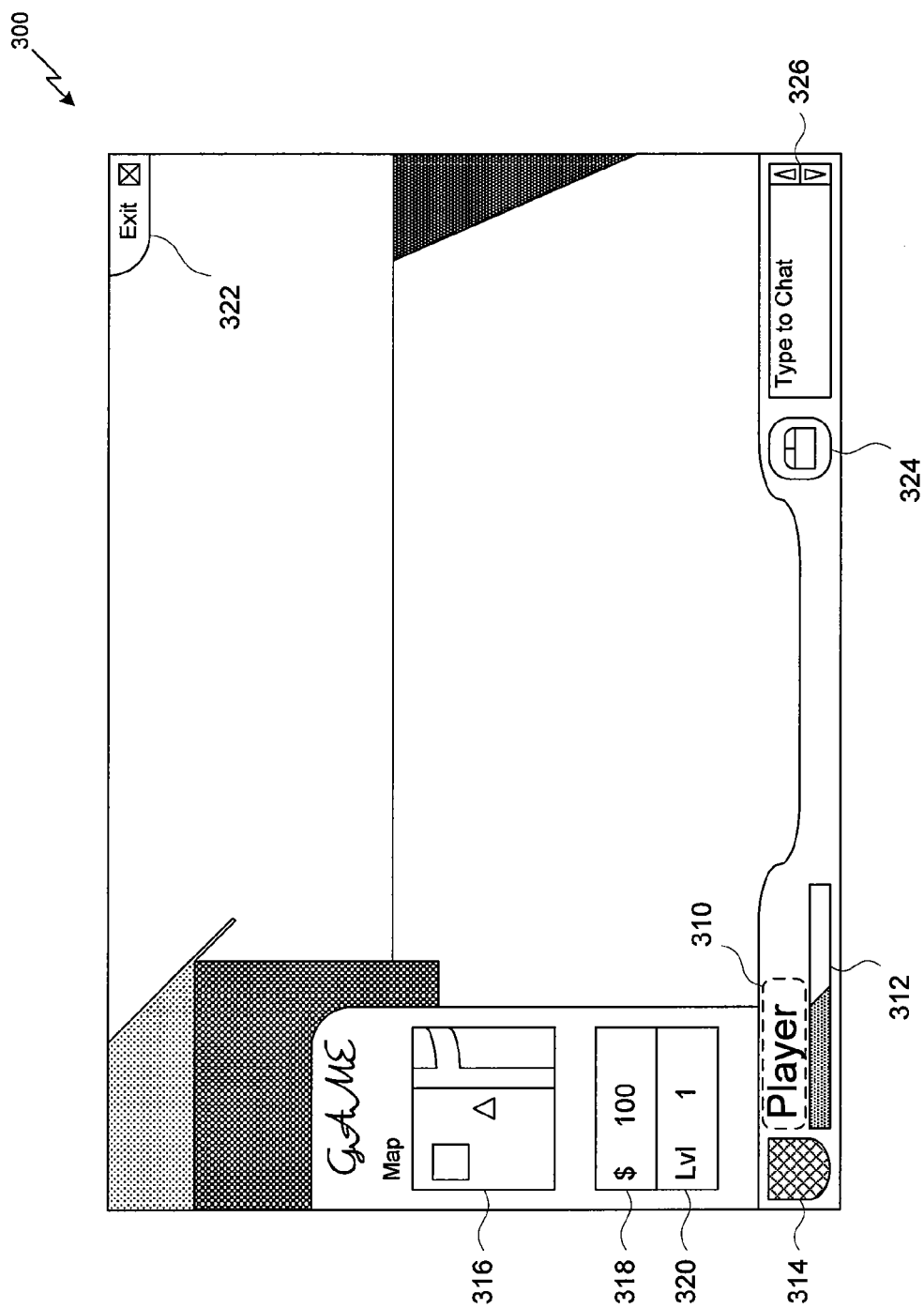
FIG. 3 illustrates a graphical user interface displayed by an application or a client application, according to one example embodiment of the present disclosure.

FIG. 3 illustrates a GUI 300 displayed by an application 131 or a client application 220, according to one example embodiment of the present disclosure. GUI 300 may enable a user to control an avatar within a virtual environment and interact with other avatars associated with other users or computer-controlled entities. As shown in FIG. 3, GUI 300 displays a graphical representation of the virtual environment from a first person point-of-view (POV). In other words, the local user of application 131 or client application 220 cannot see the avatar associated with the local user in the graphical representation of the virtual environment. In other embodiments, the GUI 300 may display a graphical representation of the virtual environment from a third person POV such that the local user's avatar is included in the scene.

GUI 300 includes a plurality of elements that enable the user to interact with objects in the virtual environment. For example, GUI 300 includes a name text box 310 that displays a username associated with the user. GUI 300 also includes a status bar 312 that indicates progress within the application such as a health of the user's avatar (i.e., if the application includes a battle component) or a progression of points that a user has accumulated to reach a new level. GUI 300 may also include a user icon 314 that is associated with the user. For example, the user icon 314 may be a shield that is configured to indicate a predominant player type associated with the user.

GUI 300 may include additional elements as well such as a map element 316, a money indicator 318, and a level indicator 320. The map element 316 shows at least a portion of the virtual environment from a top view perspective, which enables the user to quickly identify the location of their avatar in the virtual environment. The money indicator 318 and level indicator 320 relay important information about the attributes associated with the user, such as whether the user has enough virtual money to purchase a virtual item within the virtual environment or what level the user has reached.

GUI 300 may also include interactive elements such as a close button 322 or an inventory button 324. The close button 322 lets a user exit the application and the inventory button 324 causes a window to open such that a user may select various virtual items to use in the virtual environment. For example, items may include different weapons (i.e., in a game that includes battles) or different accessories for a car (e.g., in a racing game). As also show in FIG. 3, GUI 300 may include a chat window 326 that enables a user to chat with remote users connected to the virtual environment. The chat window 326 enables text entered by the user using the keyboard 108 to be transmitted to remote users and displays text entered by remote users.

One of skill in the art would readily appreciate that the particular elements that comprise GUI 300 represent only one exemplary combination and that other arrangements and designs for GUI 300, including different types and styles of elements, are within the scope of the present disclosure. For example, another GUI designed for an application that pits one player against another in a battle may display a name text box and status bar for each of the two players currently involved in a battle. Furthermore, other buttons and toolbars may be included in GUI 300 to enable a user to access various functions of the application 131.

Figure 4:
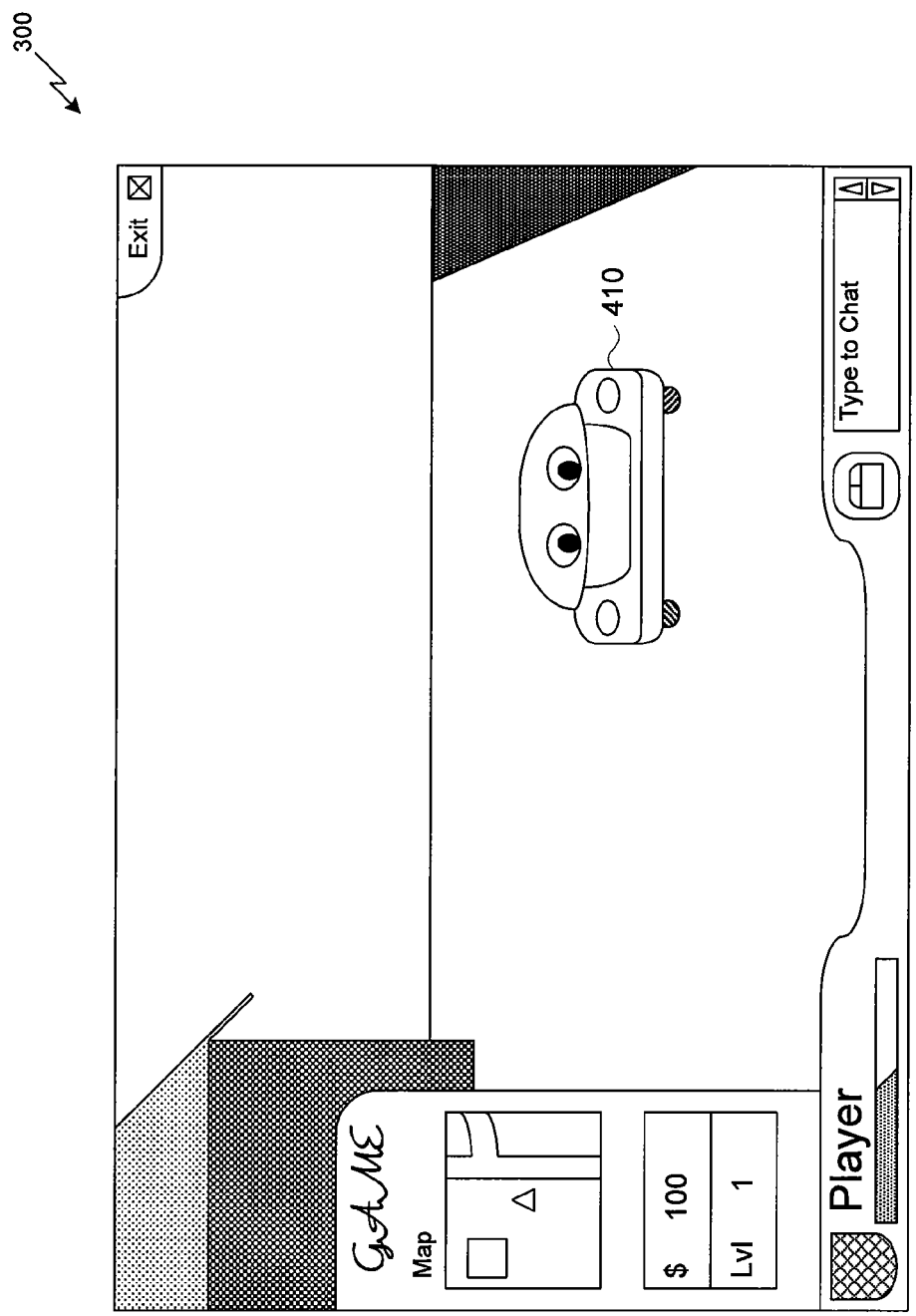
FIG. 4 illustrates an avatar associated with a remote user displayed in the graphical user interface of FIG. 3, according to one example embodiment of the present disclosure.

FIG. 4 illustrates an avatar 410 associated with a remote user displayed in the GUI 300 of FIG. 3, according to one example embodiment of the present disclosure. Multiple users may interact within the virtual environment simultaneously. For example, a first user connects to server computer 240 via a first client computer 210, a second user connects to server computer 240 via a second client computer 210, etc. When two or more users navigate to the same location within the virtual environment, GUI 300 may display an avatar associated with the other users in each user's GUI displayed on the client computers 210. As shown in FIG. 4, avatar 410 represents a remote user as seen in the GUI displayed to the local user. Avatar 410 is a graphical representation of a car object within the virtual environment. In this example embodiment, each user is associated with a different car in the virtual environment and may move around in the virtual environment and interact with other cars such as by talking to other users using chat window 326 or challenging the other users to a simulated race (i.e., a battle).

In one embodiment, the virtual environment is modeled by programmers by defining the various geometry, colors, shading, and textures of a plurality of objects in the virtual environment. Each object in the virtual environment may be defined by a plurality of primitives (i.e., lines, triangles, triangle strips, polygons, etc.) that include one or more 3D vertices. A comprehensive model of the virtual environment may be stored in database 252. Display processor 112 (in either the client computer 210 or the server computer 240) may receive the data defining the virtual model and render the data via a 3D graphics pipeline to produce the 2D image shown in GUI 300. Each avatar 410 in the virtual environment may also be defined as a plurality of primitives that enable a graphical representation of the players to be rendered in the scene.

Although a local user may view GUI 300 of FIG. 4 and recognize that a remote user has navigated to approximately the same location in the virtual environment as the local user, the avatar 410 shown in FIG. 4 provides little information about the remote user to the local user. Therefore, an improvement to the GUI 300 of FIG. 4 would be to display some type of graphical representation about the remote user in the rendered scene displayed in GUI 300.

Figure 5:
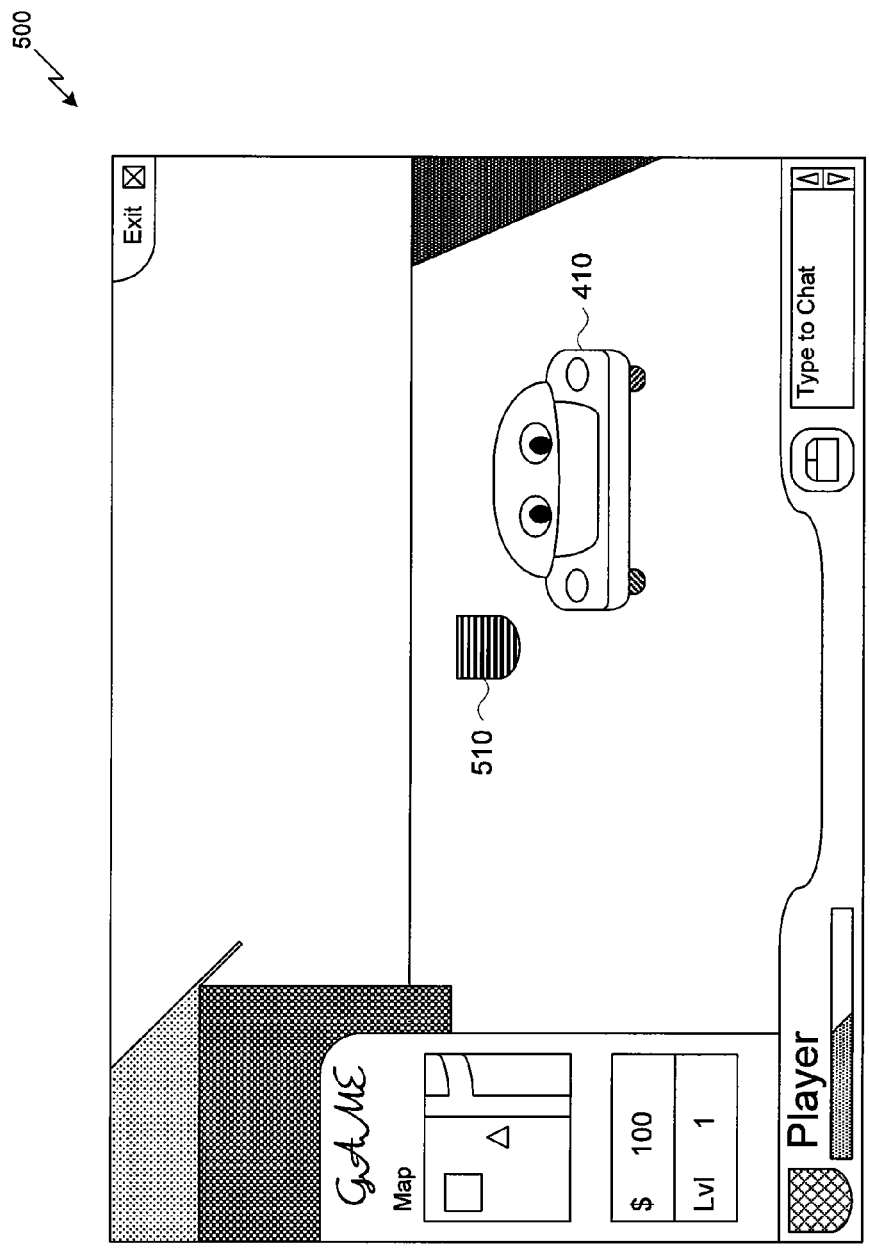
FIG. 5 illustrates a badge associated with a remote user in the virtual environment, according to one example embodiment of the present disclosure.

FIG. 5 illustrates a badge 510 associated with a remote user in the virtual environment, according to one example embodiment of the present disclosure. GUI 500 is similar to GUI 300, as described above. However, as shown in FIG. 5, a graphical representation (i.e., a badge 510) that reflects information associated with the remote user is also rendered in the scene. The badge 510 is rendered within the virtual environment at a location proximate to the avatar 410. In one embodiment, badge 510 may indicate the predominant player type (i.e., killer, socializer, etc.) associated with the remote user. As shown, badge 510 is an icon in the shape of a shield, although any visual attribute that meaningfully conveys information about the player type is contemplated. The predominant player type may be indicated by the color of the badge. In one embodiment, the badge 510 "floats" next to the avatar. The badge 510 may not have 3D characteristics and instead may simply be a 2D overlay generated in the scene after rendering of the virtual world. In other embodiments, the badge 510 may be an object within the virtual environment that is associated with the avatar 410, for example, the badge 510 may be the clothing that the avatar 410 wears or may be an item that the avatar 410 carries.

For example, a programmer may design GUI 500 such that each player type of a plurality of different player types is associated with one of a plurality of different colors. In one embodiment, badge 510 may be associated with one of the four player types defined by the Bartle Test; i.e., killer, socializer, achiever, or explorer. Badge 510 is rendered in green if the player is characterized as a killer. Badge 510 is rendered in yellow if the player is characterized as an achiever. Badge 510 is rendered in blue if the player is characterized as a socializer. Badge 510 is rendered in brown if the player is characterized as an explorer. In one embodiment, the particular hue of the badge 510 represents the strength of the score for that particular player type. For example, a light brown would indicate that the player is characterized as predominantly an explorer, but that the player may perform actions characterized by the other player types frequently as well. Conversely, a dark brown would indicate that the player rarely performs actions that are inconsistent with the explorer characterization.

In another embodiment, the programmer may define different player types that are not defined by the Bartle test. For example, a programmer may choose to have two player types such as a "white knight" and a "black knight" that are characterized by good actions or evil actions, respectively. The programmer may define any number of player types for a particular virtual environment. In such embodiments, the implementation of player engine 254 would assign different types of actions as being characteristic of each of the different player types. Badge 510 would then be rendered in the color of the predominant player type for a given player. In other embodiments, badge 510 may indicate the player type via different graphical icons. For example, a killer may be associated with a sword icon, a socializer may be associated with a text balloon icon, an achiever may be associated with a blue ribbon icon, and an explorer may be associated with a map icon. It will be appreciated that many other icons may be associated with each of the player types. For example, four different types of cars (e.g., a sports car, a convertible, a sport utility vehicle, and a truck) may be associated with the killer, socializer, achiever, and explorer player types. In yet other embodiments, badge 510 may indicate the predominant player type via other types of distinct graphical representations. For example, badge 510 may be a single color, but the pattern of badge 510 may change to indicate the different player types. In another example, the shape of badge 510 may change to indicate the different player types.

Figure 6:
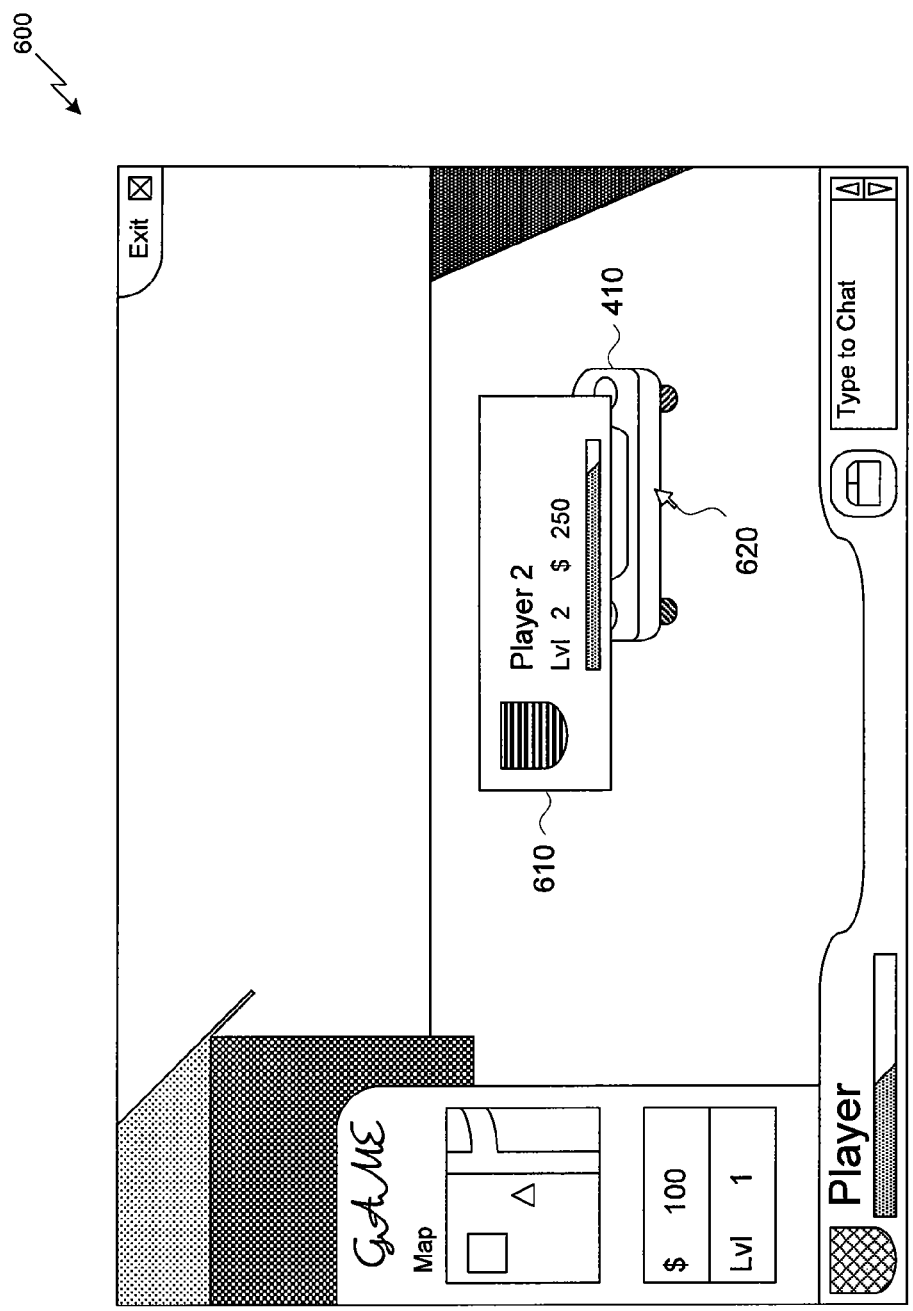
FIG. 6 illustrates a badge associated with a remote user in the virtual environment, according to another example embodiment of the present disclosure.

FIG. 6 illustrates a badge 610 associated with a remote user in the virtual environment, according to another example embodiment of the present disclosure. GUI 600 is similar to GUI 300 and GUI 500, described above. However, as shown in FIG. 6, badge 610 is rendered in the scene only when the user hovers a cursor 620 associated with mouse 108 over the avatar 410 associated with the remote user. Badge 610 is a graphical overlay window that includes the same shield icon as described in FIG. 5. However, in addition to the shield icon, additional information is provided in the badge 610 that specifies attributes associated with the remote user. For example, as shown in FIG. 6, the badge 610 includes a username, a level value, a money amount, and a status bar associated with the remote user. In some environments, many users may populate a small space, thereby requiring many different avatars to be rendered in the same scene displayed in GUI 600. In such environments, a programmer may prefer to only display a badge for a single avatar at a time when the user hovers the mouse over that avatar for a small portion of time.

In yet other embodiments, a badge (e.g., badge 510, or badge 610) may be displayed at a location in the GUI that is unrelated to the position of the avatar within the scene. For example, badge 510 may be displayed on the toolbar at the bottom of the screen along with the username associated with the player.

Figure 7A:
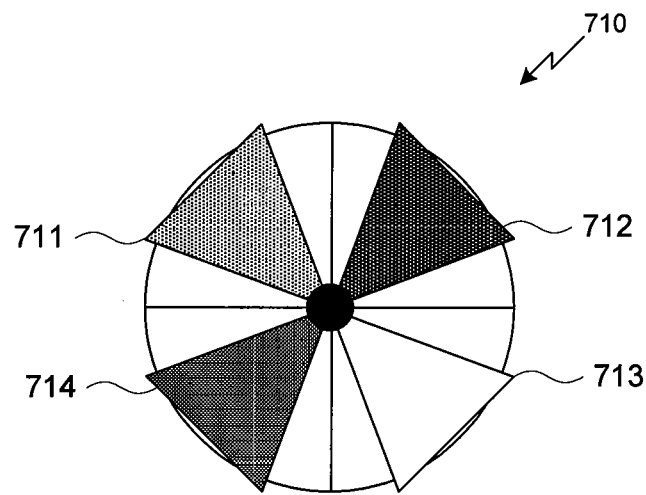
FIGS. 7A and 7B illustrate badges that reflect the relative scores stored in a player type profile for a user, according to another example embodiment of the present disclosure.
Figure 7B:
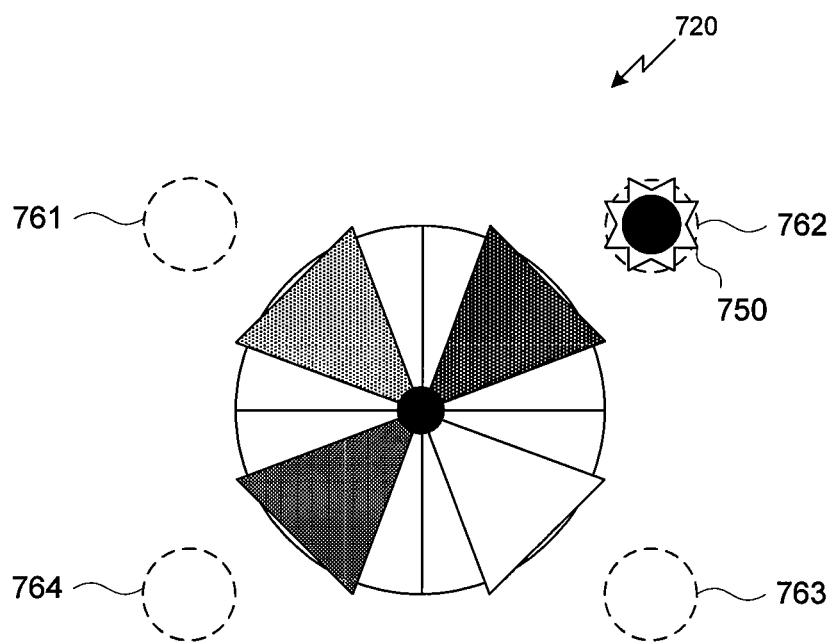

FIGS. 7A and 7B illustrate badges 710 and 720 that reflect the relative scores stored in a player type profile for a user, according to another example embodiment of the present disclosure. As shown in FIG. 7A, badge 710 indicates the relative scores associated with four distinct player types, such as the killer, socializer, achiever, and explorer player types. An upper left quadrant of badge 710 includes a slice 711 associated with the first player type. An upper right quadrant of badge 710 includes a slice 712 associated with the second player type. A lower right quadrant of badge 710 includes a slice 713 associated with the third player type. A lower left quadrant of badge 710 includes a slice 714 associated with the fourth player type. Each slice is rendered in a color corresponding to the player type associated with that slice. For example, slice 711 is rendered in green for the killer player type, slice 712 is rendered in yellow for the achiever player type, slice 713 is rendered in blue for the socializer player type, and slice 714 is rendered in brown for the explorer player type. The gradient (i.e., the shade of the particular hue) of each slice may indicate the relative scores compared to the other player types. As shown, slice 713 is clear indicating that a score for the player corresponding to the socializer player type is zero (i.e., none of the actions of the user characterize the socializer player type).

As shown in FIG. 7B, badge 720 is similar to badge 710 except that badge 720 includes icon locations 761, 762, 763, and 764 associated with each of the four distinct player types, respectively. An icon 750 may be displayed at each of the icon locations that also characterizes the player type associated with each quadrant of badge 720. For example, the blue ribbon icon 750 may indicate that the upper right quadrant is associated with the achiever player type. In one embodiment, an icon 750 associated with each particular player type is displayed in each one of the icon locations 761-764. In another embodiment, an icon is displayed when a user has accomplished a particular goal associated with the player type corresponding to that icon location. For example, blue ribbon icon 750 may only be displayed if the user level associated with the user is above a threshold level.

Figure 8A:
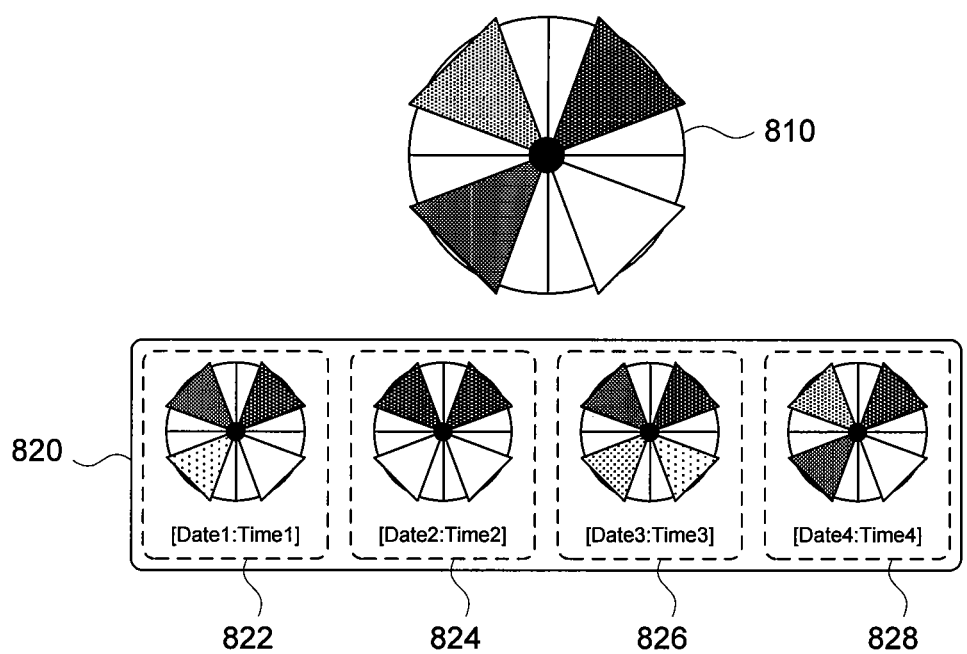
FIGS. 8A and 8B illustrate techniques for viewing a plurality of graphical representations of player type profiles stored for a user that dynamically changes over time, according to different example embodiments of the present disclosure.
Figure 8B:
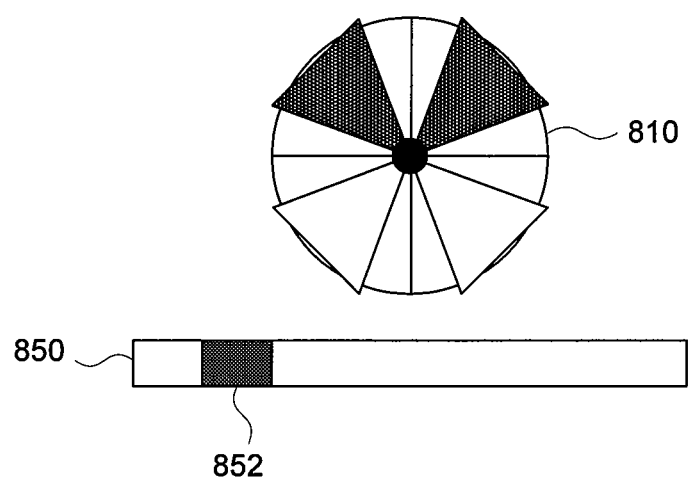

FIGS. 8A and 8B illustrate techniques for viewing a plurality of graphical representations of player type profiles stored for a user that dynamically changes over time, according to different example embodiments of the present disclosure. As shown in FIG. 8A, badge 810 is similar to badge 710 of FIG. 7A. In one embodiment, a window 820 is displayed that shows a plurality of graphical representations of stored player type profiles for a user generated at previous points in time. As described above, the player type profile associated with a particular user may be dynamically updated as a player performs new actions within the virtual environment. For example, a player may be predominantly characterized as a killer player type at a first point in time, but as the game progresses, the player meets friends in the virtual environment and begins to engage in more social behavior by initiating chats with other users. Thus, at a second point in time, the player type profile has changed such that the score for the killer player type is substantially equal to the score for the socializer player type.

The window 820 includes graphical representations (or icons) 822, 824, 826, and 828 that reflect the badge 810 as configured at four previous points in time based on player type profiles stored in database 252. Icon 822 reflects the configuration of badge 810 at a first point in time, icon 824 reflects the configuration of badge 810 at a second point in time, icon 826 reflects the configuration of badge 810 at a third point in time, and icon 828 reflects the configuration of badge 810 at a fourth point in time. As shown, each icon (822, 824, 826, and 828) includes a graphical depiction of badge 810 as well as a timestamp displayed below the graphical depiction that specifies the time associated with that particular configuration of badge 810. Window 820 may be configured to dynamically change in size as more player type profiles for a given user are stored in database 252. In some embodiments, window 820 may be configured with a scrollbar that is configured to enable more than a maximum number of icons to be displayed within a window 820 of a particular size. For example, player engine 254 may store 10 distinct player type profiles in database 252. However, window 820 may be configured to only display up to a maximum of 4 icons in a single screen. In such cases, a horizontal scrollbar may be displayed at the bottom of window 820 that enables the user to select which 4 consecutive icons out of the 10 total possible icons are currently displayed in window 820. In such embodiments, badge 810 always reflects the current player type profile.

In yet another embodiment as shown in FIG. 8B, window 820 of FIG. 8A may be replaced by scrollbar 850 that is configured to enable the user to change the appearance of badge 810 to reflect the player type profile associated with the player at a previous point in time. Scrollbar 850 includes a thumb 852 that can be dragged by a user from the left side of scrollbar 850 to the right side of scrollbar 850. The far left side of scrollbar 850 corresponds to a first point in time that reflects the earliest point in time associated with a player type profile stored in database 252. The far right side of scrollbar 850 corresponds to a second point in time that reflects the current point in time. All previously stored player type profiles associated with different points in time between the first time and the second time may be viewed by dragging thumb 852 to a location on scrollbar 850 between the far left side and the far right side. As the user changes the location of thumb 852 on scrollbar 850, the configuration of badge 810 is adjusted to reflect the player type profile associated with the point in time corresponding to the location of thumb 852. Therefore, by dragging thumb 852 from left to right on scrollbar 850, a user may dynamically view the player type history for a given player from earliest to latest.

Figure 9:
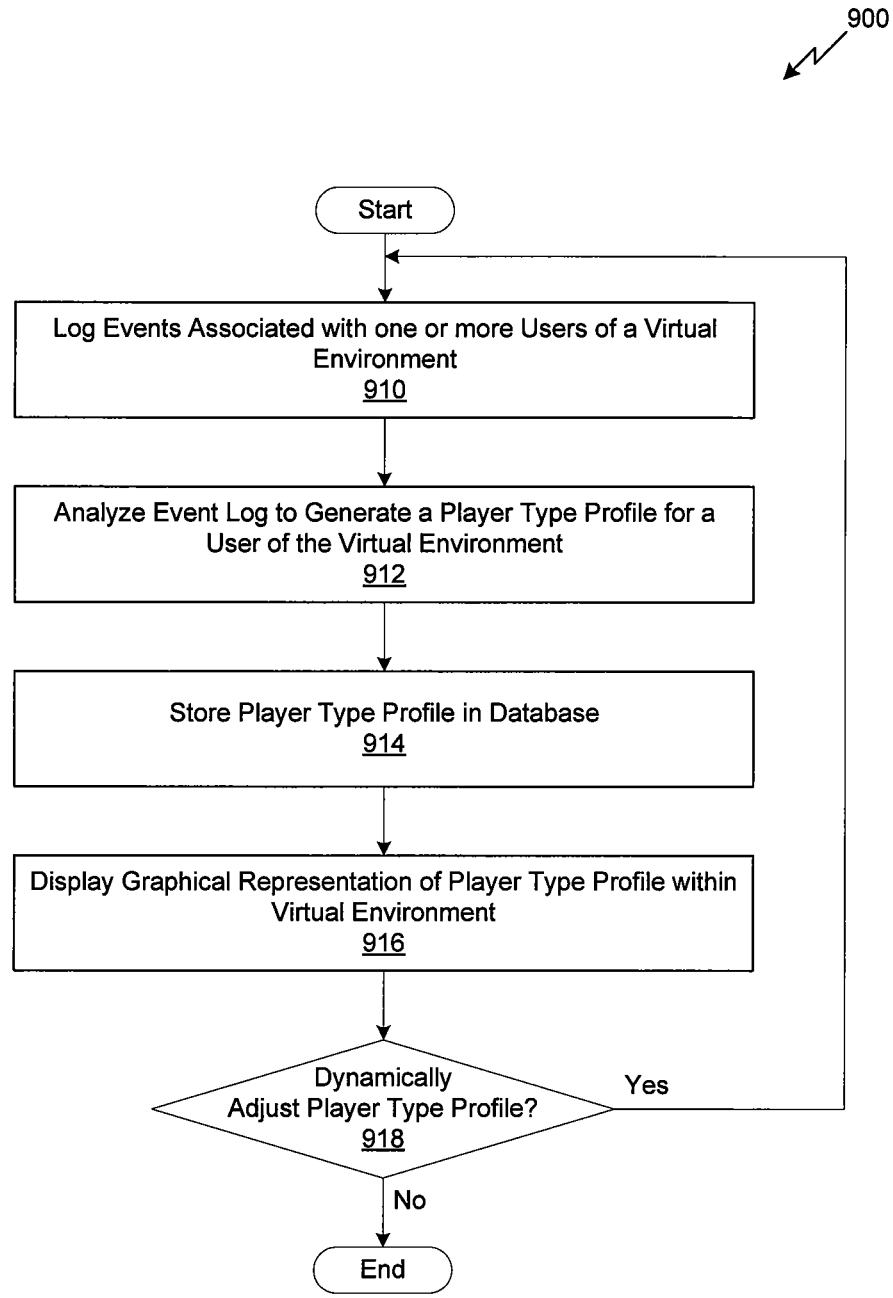
FIG. 9 is a flow diagram of method steps for generating and displaying a graphical representation of a player type profile, according to one example embodiment of the present disclosure.

FIG. 9 is a flow diagram of method steps 900 for generating and displaying a graphical representation of a player type profile, according to one example embodiment of the present disclosure. Although the method steps are described in conjunction with the systems of FIGS. 1-8B, persons skilled in the art will understand that any system configured to perform the method steps, in any order, is within the scope of the present disclosure.

As shown, method 900 begins at step 910 where an application (i.e., application 131 or server application 250 via player engine 254) logs events associated with one or more users connected to a virtual environment. In one embodiment, application 131 detects input from a user that triggers an event. An entry associated with the event is stored in a log file. In another embodiment, client application 220 detects input from a user that is transmitted to server application 250. Then, server application 250 causes player engine 254 to create an entry for the event in a log file. At step 912, the application analyzes the event log to generate a player type profile for a particular user of the virtual environment. In one embodiment, the player type profile is generated when the log file include N number of entries. In another embodiment, the player type profile is generated once a month. At step 914, the player type profile is stored in database 252.

At step 916, the application renders a graphical representation of the player type profile and displays the graphical representation in a GUI. In one embodiment, application 131 includes a GUI 500 that displays a badge 510 proximate to an avatar 410 that reflects the predominant play type associated with avatar 410. At step 918, the application determines whether to dynamically adjust the player type profile associated with a user. If the application is configured to dynamically adjust the player type profile, then method 900 returns to step 910 where events are logged and analyzed in order to update the player type profile based on new events and then the graphical representation of the player type profile is adjusted. However, if the application is not configured to dynamically adjust the player type profile (i.e., a player type profile is only generated a single time for each user), then method 900 terminates.

In sum, the technique described above provides a mechanism for generating data for characterizing a predominant player type associated with a particular user of a virtual environment and then displaying a graphical representation of that data that may be quickly referenced by other users of the virtual environment in order to gauge whether the user wants to engage the other user. Importantly, the graphical representation allows users to quickly make decisions without wasting time where they could be performing other actions. Such techniques increase the user experience with the virtual environment by reducing frustration related to failed attempts to learn such information through conventional interfaces such as a chat window.

While the foregoing is directed to embodiments of the present disclosure, other and further embodiments may be devised without departing from the basic scope thereof. For example, aspects of the present disclosure may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments thereof.

In view of the foregoing, the scope of the present disclosure is determined by the claims that follow.

What is claimed is:

1. A computer-implemented method for displaying social badges rendered within a virtual interactive environment, the method comprising:

receiving, by operation of a computer processor, one or more first actions of an avatar representing a remote user within the virtual interactive environment;

outputting the first actions to a log;

generating a player type profile for the remote user based on an analysis of the first actions in the log, wherein the player type profile characterizes the remote user as at least one of a plurality of different player types and wherein the player type profile is updated periodically and each updated player type profile is stored by a point in time in a database associated with the remote user;

generating a social badge representing the player type profile at a current point in time for display in the virtual interactive environment, wherein the social badge comprises an icon having a color that represents a predominant player type in the player type profile;

rendering one or more second actions of the avatar representing the remote user within the virtual interactive environment, wherein the rendering of the avatar includes the social badge and wherein the avatar interacts with the virtual interactive environment;

storing the social badge in the database associated with the remote user, wherein the database includes a plurality of social badges, each social badge representing a player type profile at a previous point in time;

receiving, from the remote user, a selection of one of the plurality of social badges representing the player type profile at the previous point in time;

re-rendering an appearance of the social badge representing the player type profile at the current point in time to the selected social badge representing the player type profile at the previous point in time; and outputting the second actions and the selection of one of the plurality of social badges representing the player type profile at the previous point in time to the log.

2. The method of claim 1, wherein generating the player type profile for the remote user comprises:

generating a score associated with each player type of the plurality of different player types based on the analysis of the first actions; and generating the player type profile based on the scores.

3. The method of claim 2, wherein the scores are generated based on a summation of weighted factors corresponding to each of the first actions.

4. The method of claim 1, wherein the icon is divided into a discrete number of segments, wherein each segment in the discrete number of segments is associated with one of the different player types included in the player type profile, and wherein the color of each segment represents a strength of a score associated with the player type corresponding to that segment.

5. The method of claim 1, further comprising:
displaying a social badge of two or more of the periodically updated player type profiles in the virtual interactive environment.

6. A computer-readable non-transitory medium storing instructions that, when executed by a processing unit, cause the processing unit to perform operations for displaying social badges rendered within a virtual interactive environment, the operations comprising:
receiving one or more first actions of an avatar representing a remote user within the virtual interactive environment;
outputting the first actions to a log;
generating a player type profile for the remote user based on an analysis of the first actions in the log, wherein the player type profile characterizes the remote user as at least one of a plurality of different player types and wherein the player type profile is updated periodically and each updated player type profile is stored by a point in time in a database associated with the remote user;
generating a social badge representing the player type profile at a current point in time for display in the virtual interactive environment, wherein the social badge comprises an icon having a color that represents a predominant player type in the player type profile;
rendering one or more second actions of the avatar representing the remote user within the virtual interactive environment, wherein the rendering of the avatar includes the social badge and wherein the avatar interacts with the virtual interactive environment;
storing the social badge in the database associated with the remote user, wherein the database includes a plurality of social badges, each social badge representing a player type profile at a previous point in time;
receiving, from the remote user, a selection of one of the plurality of social badges representing the player type profile at a previous point in time;
re-rendering an appearance of the social badge representing the player type profile at the current point in time to the selected social badge representing the player type profile at the previous point in time; and
outputting the second actions and the selection of one of the plurality of social badges representing the player type profile at the previous point in time to the log.

7. The computer-readable medium of claim 6, wherein generating the player type profile for the remote user comprises:
generating a score associated with each player type of the plurality of different player types based on the analysis of the first actions; and
generating the player type profile based on the scores.

8. The computer-readable medium of claim 7, wherein the scores are generated based on a summation of weighted factors corresponding to each of the first actions.

9. The computer-readable medium of claim 6, wherein the icon is divided into a discrete number of segments, wherein each segment in the discrete number of segments is associated with one of the different player types included in the player type profile, and wherein the color of each segment represents a strength of a score associated with the player type corresponding to that segment.

10. The computer-readable medium of claim 6, further comprising displaying a social badge of two or more of the periodically updated player type profiles in the virtual interactive environment.

11. A system for displaying social badges rendered within a virtual interactive environment, the system comprising:
a processing unit; and
a memory coupled to the processing unit and including an application that is configured to:
receive, by operation of a computer processor, one or more first actions of an avatar representing a remote user within the virtual interactive environment;
output the first actions to a log;
generate a player type profile for the remote user based on an analysis of the first actions in the log, wherein the player type profile characterizes the remote user as at least one of a plurality of different player types and wherein the player type profile is updated periodically and each updated player type profile is stored by a point in time in a database associated with the remote user,
generate a social badge representing the player type profile at a current point in time for display in the virtual interactive environment, wherein the social badge comprises an icon having a color that represents a predominant player type in the player type profile,
render one or more second actions of the avatar representing the remote user within the virtual interactive environment, wherein the rendering of the avatar includes the social badge and wherein the avatar interacts with the virtual interactive environment,
store the social badge in the database associated with the remote user, wherein the database includes a plurality of social badges, each social badge representing a player type profile at a previous point in time,
receive, from the remote user, a selection of one of the plurality of social badges representing the player type profile at the previous point in time,
re-render an appearance of the social badge representing the player type profile at the current point in time to the selected social badge representing the player type profile at the previous point in time, and
output the second actions and the selection of one of the plurality of social badges representing the player type profile at the previous point in time to the log.

12. The system of claim 11, the memory further including a database and a player engine that is configured to generate the player type profile for the remote user by:
generating a score associated with each player type of the plurality of different player types based on the analysis of the first actions; and
generating the player type profile based on the scores, wherein the player type profile is stored in the database.

13. The system of claim 12, wherein the scores are generated based on a summation of weighted factors corresponding to each of the first actions.

14. The system of claim 11, wherein the icon is divided into a discrete number of segments, wherein each segment in the discrete number of segments is associated with one of the different player types included in the player type profile, and wherein the color of each segment represents a strength of a score associated with the player type corresponding to that segment.

15. The system of claim 11, wherein the system further comprises a network adapter configured to communicate with one or more client computers coupled to the system via an external network, and wherein a graphical user interface is displayed on a display device associated with a first client computer.

* * * * *